Patented Apr. 23, 1935

1,998,685

UNITED STATES PATENT OFFICE 1,998,685

METHOD OF EXTRACTING OXIDE OF BERYLLIUM DIRECT FROM THE MINERALS CONTAINING SAME

Gino Panebianco and Carlo Adamoli, Milan, Italy

No Drawing. Application August 28, 1931, Serial No. 559,926. In Italy September 5, 1930

7 Claims. (Cl. 23—18)

The great difficulty in obtaining oxide of beryllium commercially is well known. The chemical nature of the minerals containing beryllium (silicates, silicic acid, alumina compositions, etc.) requires long mechanical, thermic and chemical operations with a considerable outlay for power and reagents.

These difficulties and the attendant cost, have led to the result that to obtain beryllium, only one mineral "beryl", has been used exclusively and not because it is more plentifully found in nature, but because it is a high grade (more than 10% of oxide of beryllium) and requires less expense for extraction, notwithstanding the higher costs for mining in this case.

However the distribution of beryllium in nature in low grade minerals is very notable and the problem of obtaining it to a sufficient extent for industrial purposes, depends on the possibility of extracting it from those low grade minerals which are abundant in nature.

The object of this invention is to provide means by which low and very low grade beryllium materials can furnish oxide of beryllium, by a simple chemical process and at a minimum cost. Beryllium materials, such as pegmatites, feldspars, mica, mica-schists, granites, kaolins and clays, are treated after suitable roasting and after having been carefully reduced to powder, with a large quantity of pure water at an ordinary temperature and are submitted to the action of carbonic acid and agitation at the same time. The roasting of the material to be submitted to extraction is an important part of the process; it indicates which portions of the ore are to be selected or discarded by the changes caused by heating, and it also brings about a profound molecular displacement of the alkali and earth alkali metal elements in the silicates which favors the subsequent aqueous extraction. The roasting can take place after the ore is powdered or after admixture with chalk, limestone, magnesium oxide, magnesite, dolomite or other ores having a prevailing content of calcium or magnesium or both when the original ore is found to be too poor in earth alkali metal constituents.

This action is favoured by the presence of acids or weak bases in traces, with the result of reducing the duration of the process.

The solution which is separated from the mineral residue by decantation or a centrifugal process after a suitable period of time, contains together with considerable quantities of calcium, magnesium, alkalis and small quantities of silicic acid, alumina and iron, the largest part of the beryllium contents in the mineral, all dissolved therein.

By means of evaporation, this water regenerates the pure water necessary for the following lots and leaves a residuum of earth, alkaline-earth and alkaline carbonates which is gathered together; by means of small quantities of bicarbonate of sodium, added to the residue when again brought into solution the carbonate of beryllium is set free in a very pure state.

Naturally this process of extraction, instead of being carried out with large quantities of water at one time, can be resorted to by using small quantities at a time and by repeating the extractions; and also a pressure of carbonic anhydride can be resorted to, according to the mineral material used while the temperature can be sent up to 80 to 100° C. Furthermore bicarbonate of soda solution under pressure can be used as a substitute for the carbon dioxide gas, for the action of the gas is favored by the presence of a base as an alkali carbonate or bicarbonate.

Also for the action of the carbonic anhydride, instead of using that which is made specially by other means, a fermentation can be caused in the feldspar mass by adding organic substances which are residues of other processes. All those substances which give rise to the formation of hydroxidions or hydrogenions in the liquid can be used as accelerators of the process; thus ammonia and soda on one hand, and hydrochloric and sulphuric acids on the other, offer the greatest efficacy.

Example

Five or six kilogrammes of berryllium pegmatite from Val Musul (Bolzano) are heated for 10 hours at a temperature of 850 to 900° C. and then water-ground as finely as possible (up to about the 6000 mesh grade), and separated by means of decantation of the liquid, then dried in the air and used afterwards.

5 kilograms of the dry powder are taken and put into a porcelain vessel provided with a wooden stirring device having at least 100 revolutions per minute and the vessel is filled with water. A dip pipe passes through the cover of the vessel almost as far as the wings of the stirring device. By means of a cylinder of carbonic anhydride, a gurgling of gas in the liquid is constantly kept active. The stirring is continued for several days, while the water to be used is distilled and to the same is added 50 grammes of carbonate of ammonium for every 10 kilograms.

When the saturation of the liquid with alkaline earth salts is finished and while the stirring is continuing, it is slightly acidified with hydrochloric acid and small quantities of the aforesaid acid added little by little as it becomes neutralized.

When a sufficient quantity of salts are in solution, the solid part is separated from the liquid by the centrifugal process. The liquid is evaporated to dryness in a porcelain dish and is purified from silicic acid by means of repeated acid extraction. The extract is then filtered and the filtrate neutralized with ammonia while bicarbonate of sodium is added in a sufficient quantity to leave a small layer of the latter on the bottom of the vessel. It is stirred frequently and left to digest for 24 hours when it is filtered and acidified with hydrochloric acid. The liquid is then boiled until it is free from all the carbonic anhydride, and then the hydrate of beryllium is precipitated with ammonia, and the former is gathered on a filter, washed, dried and strongly heated. With several repeated extractions of the same mineral, the greater part of the beryllium contained therein will go into solution and can be gathered from the latter. The first extraction will yield about one fifth of the oxide of beryllium contained in the mineral, according to the degree of fineness which will be reached in the grinding, and to the quality of the mineral.

If the operation is well carried out and if the mineral used will have contents of about 1% of oxide of beryllium, about 10 grammes of purified oxide can be obtained in the first extraction.

We claim:

1. In a process of separating beryllium compound from a mineral containing it the steps which comprise roasting the mineral at high temperature, mixing the roasted mineral with water, saturating the mixture with carbon dioxide, separating the liquid, and neutralizing the liquid with sodium bicarbonate.

2. In a process of separating beryllium compound from a mineral containing it the steps which comprise roasting the mineral having present therein alkali or earth alkali metal compounds and treating the roasted material in water with carbon dioxide.

3. In the process of obtaining beryllium compounds from low grade ore containing them the steps which comprise roasting the ore, grinding the roasted ore to a powder, mixing the powdered mass with a large amount of water, and treating the mixture with carbon dioxide whereby the beryllium content is largely carried into solution and separated from the insoluble residue.

4. In a process of decomposing beryllium-containing ore the steps which comprise roasting the ore, and treating the roasted ore in water with carbon dioxide in the presence of an accelerator.

5. In a process of decomposing a beryllium-containing ore the steps which comprise roasting the ore, and treating the roasted ore in water with carbon dioxide in the presence of a base.

6. In a process of decomposing a beryllium-containing ore the steps which comprise roasting the ore, suspending the powdered ore in water, passing carbon dioxide therethrough, saturating the liquid with alkaline earth salt, separating the liquid from the solids, evaporating the liquid to dryness, purifying the residue from silicic acid by extraction, filtering, neutralizing the filtrate with ammonia while adding bicarbonate of soda, again filtering, acidifying, and precipitating with ammonia.

7. In a process of decomposing beryllium-containing ore the steps which comprise roasting the ore, mixing the roasted ore with water, passing carbon dioxide through the mixture to the point of saturating the liquid with alkaline earth salts present in the ore, separating the liquid, evaporating the liquid, extracting the residue, and treating the filtrate with a base.

GINO PANEBIANCO.
CARLO ADAMOLI.